Patented Nov. 3, 1936

2,059,640

UNITED STATES PATENT OFFICE 2,059,640

LUMINOUS DISCHARGE LAMP

Harrison Porter Hood, Corning, N. Y., assignor to Corning Glass Works, Corning, N. Y., a corporation of New York No Drawing. Application January 8, 1936, Serial No. 58,224

6 Claims. (Cl. 176—122)

This invention relates to an opal glass whose opacity will remain unchanged on reheating and cooling, such a glass being especially applicable to manufacture into tubes to be used in the fabrication of luminous discharge tubes containing mercury and/or rare gases. It has been proposed to introduce into the material of such tubes fluorescing material to utilize the energy of the short wave radiations emitted by such tubes. In such tubes opalescence increases the amount of visible light emitted because under normal conditions; that is, to say, when the tube is of clear fluorescent glass, some of the light emitted by the fluorescent materials which are incorporated therein is reflected internally from the outer surface of the tube and may suffer repeated reflections in the tube, whereas, when the glass is opalescent, the opal nuclei become the seat of the emitted light.

Prior opal glasses are not suitable for the fabrication of such luminous tubes because their opacity changes when reheated locally and it is necessary in the fabrication of such tubes to reheat locally for purposes of making bends. Since the luminosity of such tubes is in part due to the combination of opacity and fluorescence, any change in the density of opacity therefore results in greater non-uniformity of illumination than when the fluorescence is absent.

I have discovered that opal glasses, whose density will not change when the fabricated glass is reheated and cooled, may be produced by introducing into the batches therefor fluorspar and cryolite in certain critical proportions. The proportions, which I have found will cause the density or color saturation of an opal glass to remain constant on reheating, lie substantially between the ratios 1 part of fluorspar to 1 part of cryolite and 3 parts of fluorspar to 1 part of cryolite. In other words, an opal glass made from a batch containing fluorspar and cryolite in ratios of 1 to 1 and 3 to 1 respectively has the valuable property that reheating or "warming-in" has no effect on such a glass. In such a glass the density of opacity will increase only as the total amount of fluorspar and cryolite is increased and vice versa.

I have further found that when sodium silicofluoride or potassium fluoride or aluminum fluoride are substituted wholly or in part for the cryolite in the above recited ratios, the same result is obtained as when cryolite is used.

The following batches which I have melted are examples of opal glasses embodying my invention:

|  | A | B | C | D | E |
|---|---|---|---|---|---|
| Sand | 350 | 350 | 350 | 350 | 350 |
| Borax | 140 | 140 | 140 | 140 | 140 |
| Sodium carbonate | 40 | 40 | 40 | 40 | 40 |
| Potassium carbonate | 35 | 35 | 35 | 35 | 35 |
| Hydrated alumina | 25 | 25 | 25 | 25 | 25 |
| Fluorspar | 50 | 35 | 40 | 50 | 50 |
| Cryolite | 20 | 35 |  |  |  |
| Sodium silico fluoride |  |  | 30 |  |  |
| Potassium fluoride |  |  |  | 20 |  |
| Aluminum fluoride |  |  |  |  | 20 |

The above compositions when melted in closed pots at about 1350° C. will yield opal glasses the color of which will not change when the glasses are reheated locally to temperatures in the neighborhood of their softening points and subsequently cooled. Since the identity of the fluorine containing materials is lost when the batch is melted into glass, my improved glasses can be defined only in terms of the batches from which they are made.

The color density of the glasses may be intensified by increasing the total amount of fluorine compounds and vice versa, the unchangeability on subsequent heating and cooling being maintained by maintaining the above mentioned ratios between the fluorspar and the other fluorine compound.

In order to make my opal glasses fluoresce to a very high degree when irradiated with light of short wave length and particularly when irradiated with light from a mercury arc, I add to the batches therefor an element or elements which will cause such fluorescence many of which are known to the art. Some suitable fluorescing substances are copper, uranium, tin, indium, antimony, manganese, tungsten, etc. Preferably I introduce into the glass about 3% of a stannous compound by adding to the batch either a stannous compound such as stannous chloride or a stannic compound and a reducing agent such as stannic oxide and sugar.

In order further to insure that tubes made from my glasses will fluoresce in the highest possible degree, I have found it necessary to make them highly transmissive of ultra violet light by decreasing their iron content to a maximum of .02% $Fe_2O_3$. This is done by the proper selection of low iron batch materials and by melting the batches in refractories of low iron content.

In fabricating luminous discharge lamps from my glass the tubes are softened by heating and are bent to the desired shape in known manner. The shaped tubes are then provided with electrodes and are filled with a suitable gas mixture such as a mixture of mercury and neon under reduced pressure in the manner which is well known in the art.

Luminous discharge tubes made from my fluorescent opal glasses emit more visible light for a given input of energy than prior fluorescent discharge devices made of clear glass even though the latter were etched or frosted to increase the diffusibility. My glasses possess the advantage over prior opal glasses in that mine do not change in color during fabrication of the lamp and hence lamps made of my glasses possess a uniformly high illumination throughout their length.

I claim:

1. An envelope for a luminous discharge lamp composed of an unchangeable opal glass resulting from melting a batch containing fluorspar and a fluorine compound of the group consisting of cryolite, sodium silico fluoride, potassium fluoride and aluminum fluoride, the fluorspar and fluorine compound being between the ratios 1 to 1 and 3 to 1 respectively, the glass having a maximum iron content of .02% $Fe_2O_3$ and rendered fluorescent by the incorporation therein of an element which will fluoresce when exposed to light of short wave length.

2. An envelope for a luminous discharge lamp composed of an unchangeable opal glass resulting from melting a batch containing fluorspar and cryolite between the ratios 1 to 1 and 3 to 1 respectively, the glass having a maximum iron content of .02% $Fe_2O_3$ and rendered fluorescent by the incorporation therein of an element which will fluoresce when exposed to light of short wave length.

3. An envelope for a luminous discharge lamp composed of an unchangeable opal glass resulting from melting a batch containing fluorspar and cryolite between the ratios 1 to 1 and 3 to 1 respectively, the glass having a maximum iron content of .02% $Fe_2O_3$, and containing stannous tin.

4. A luminous discharge lamp which comprises a sealed opal glass tube having electrodes, the glass being made from a batch containing fluorspar and a fluorine compound of the group comprising cryolite, sodium silico fluoride, potassium fluoride and aluminum fluoride, the fluorspar and the fluorine compound being between the ratios 1 to 1 and 3 to 1 respectively, the glass having a maximum iron content of .02% $Fe_2O_3$ and rendered fluorescent by the incorporation therein of an element which will fluoresce when exposed to light of short wave length, the tube containing a gas which will emit ultraviolet light when an electric discharge is passed through the tube between the electrodes.

5. An envelope for a luminous discharge lamp composed of an opal glass containing fluorine, of constant opacity after being reheated and having a maximum ferric oxide content of .02% and an element causing fluorescence when exposed to light of short wave length.

6. An envelope for a luminous discharge lamp composed of an opal glass containing fluorine, of constant opacity after being reheated and having a maximum ferric oxide content of .02% and containing stannous tin.

HARRISON PORTER HOOD.